United States Patent [19]

Herrick

[11] 3,727,054
[45] Apr. 10, 1973

[54] X-RAY INSPECTION APPARATUS LOGIC CIRCUITRY

[75] Inventor: Norman A. Herrick, Mentor, Ohio

[73] Assignee: Picker Corporation, White Plains, N.Y.

[22] Filed: May 10, 1971

[21] Appl. No.: 141,928

Related U.S. Application Data

[63] Continuation of Ser. No. 818,697, April 23, 1969, abandoned.

[52] U.S. Cl. ............................................. 250/83.3 D
[51] Int. Cl. ............................................... G01n 23/02
[58] Field of Search .......................... 250/52, 83.3 D; 209/111.5

[56] References Cited

UNITED STATES PATENTS

| | | | |
|---|---|---|---|
| 3,158,744 | 11/1964 | Bernstein | 250/52 X |
| 2,999,591 | 9/1961 | Crump | 250/83.3 D X |
| 2,097,760 | 11/1937 | Failla | 250/83.3 D |

Primary Examiner—Walter Stolwein
Assistant Examiner—Davis L. Willis
Attorney—Watts, Hoffmann, Fisher & Heinke

[57] ABSTRACT

In X-ray inspection apparatus for responding to signals indicating a change in density of a material being inspected, such as caused by the occurrence of transverse seams or splices in the material, logic circuitry provides indications of normal splices, open splices, splices that taper by more than a predetermined amount, splices that are too wide or too narrow to be acceptable, consecutive splices that occur too closely together, and indications of an excess number of splices occurring in the material.

Two pairs of X-ray responsive elements are utilized, one pair being located adjacent each edge of a relatively flat material being inspected. The elements are so arranged that one element of each pair responds to splices of one orientation, and the other two elements respond to splices of a different orientation.

39 Claims, 8 Drawing Figures

INVENTOR.
NORMAN A. HERRICK

X-RAY INSPECTION APPARATUS LOGIC CIRCUITRY

This application is a continuation of Ser. No. 818,697, filed Apr. 23, 1969 and now abandoned.

REFERENCED PATENT APPLICATION

U.S. application Ser. No. 806,860, filed Mar. 13, 1969 by Donald T. Green for "Tire Inspector," and assigned to the assignee of this application.

BACKGROUND OF THE INVENTION

1. Field of the Invention

This invention relates to X-ray inspection apparatus, and more particularly, to logic circuitry for such apparatus for indicating acceptable and unacceptable occurrences and conditions of transversely extending density variations, such as are caused by splices, in a length of material.

2. Discussion of the Prior Art

X-ray apparatus has been used for many years to inspect various articles, among them being automobile tires. In general, such apparatus has utilized a fluorescent screen, sometimes in conjunction with an image intensifier tube, which must be continuously viewed by an inspector. This, of course, is necessarily a relatively slow inspection process, since the inspector must analyze and interpret the image. Furthermore, the inspection personnel must be trained to interpret the image properly.

It is also known to image the fluorescent screen of such apparatus on a phototube, which provides a signal to an indicator or alarm in response to a change in the amount of light provided by the fluorescent screen. Although this latter approach does remove the need for continuous human attention in some cases, it still does not provide inspection, but rather provides only defect detection. In other words, a defect is not analyzed, but its presence merely is indicated.

In the manufacture of tires, the provision of automatic inspection apparatus is most desirable. Modern day tires contain plies of cords which must be related in certain ways in order to provide tires having acceptable safety and durability qualities. Since the cords are bonded within the tire body, they are not accessible for visual inspection. Therefore, X-ray inspection is particularly useful.

Uncured or "green" tires are generally cylindrical in shape, and consist of a rubber body having fabric plies of cords imbedded in the rubber. The cords of each ply overlapped at their ends to form splices. The cords are typically arranged on a bias in the cylindrical tire body, so that the splices in a green tire extend diagonally across the body. In a two-ply tire, the splices in one ply lie at an angle with respect to the splices in the other ply. The angle is generally a relatively large one of the order of 45° or more.

In an acceptable two-ply tire, each ply should consist of no more than two sections of cords that are overlapped to form two splices. The splices in the two plies are spaced apart circumferentially, so that a splice in one ply does not cross a splice in the other ply. The splices in the same ply must be spaced apart by a minimum distance of, for example, 2 inches. If the ends of the cord sections that should overlap are spaced apart (an open splice), the tire is unacceptable. Also, the splices must fall within a certain range of widths, and must not taper from end to end by more than a predetermined amount. Failure to meet all of these criteria results in an unacceptable tire.

Accordingly, it is a general object of this invention to provide inspection apparatus logic circuitry for detecting all of the enumerated defects and providing signals to indicate acceptable and unacceptable articles.

SUMMARY OF THE INVENTION

Two pairs of X-ray responsive elements, such as photocells, are located to be respectively adjacent opposite edges of a length of material to be inspected. Two X-ray sources respectively project beams of X-rays through the material to energize the two pairs of photocells. Two photocells, one from each pair, are arranged to provide signals in response to passage of portions of different densities such as splices, having a predetermined diagonal orientation with respect to the path of travel of the material through the apparatus. The other two photocells are arranged to respond to splices having another diagonal orientation.

Correspondingly arranged photocells of the two pairs cooperate to provide signals responsive to a splice that actuate the logic circuit of the invention to indicate whether or not the splice is acceptable, whether or not two splices similarly oriented are too close together, or whether or not there are too many splices in the material.

If neither of the two cooperating photocells is actuated, an "open splice" signal is provided. If both photocells are actuated in response to a splice, the circuitry is sensitive to the time durations of the two signals from the photocells to provide signals indicative of a normal and hence acceptable splice, a splice that is too narrow or too wide, or a splice that tapers too much from one edge of the material to the other. The circuitry is also responsive to the times between consecutive signals from the two photocells to indicate that two similarly oriented splices are too close together, and to the number of signals to indicate that there are too many splices in the length of material being inspected.

DESCRIPTION OF A PREFERRED EMBODIMENT

Although the circuitry of the present invention is not limited to any particular application, it is particularly useful in inspection apparatus for checking splices in the cords of so-called "green" or uncured two-ply tires for vehicles. Therefore, it will be described in that context.

A green tire is essentially a cylinder, which consists of a rubber body having fabric plies or cords embedded in the rubber. The referenced patent application of Donald T. Green describes an inspection device for inspecting the cords of such a tire. That apparatus is adapted to inspect the cords of a two-ply tire, in which the cords of each ply generally comprise two sections overlapped at their ends to form splices. The splices in one ply lie at an angle with respect to the splices in the other ply, the angle being fixed by the machinery that cuts the cords before they are embedded in the rubber. The logic circuitry of the present invention will be described as applied to a tire inspector of the type described in the referenced application.

When inspecting a two-ply tire, it is necessary to check that a number of criteria are met. First, it must be determined whether or not there are any open splices; that is, whether there are any areas where there should be splices, but the ends of the cords do not meet or overlap. Second, it must be determined whether the splice is of normal width (overlapped), is too wide, or is too narrow. Third, it must be determined whether or not there are more than two splices in any single ply. Fourth, it must also be determined whether or not there are any splices in the same ply than are closer together than a predetermined distance, such as, for example, 2 inches. Last, it must be determined whether or not a splice tapers from one end to the other by more than a predetermined amount. A negative answer to any of the foregoing criteria means that the tire being inspected is unacceptable and must be rejected. The present invention provides logic circuitry for accomplishing the foregoing inspections.

Figure 1:
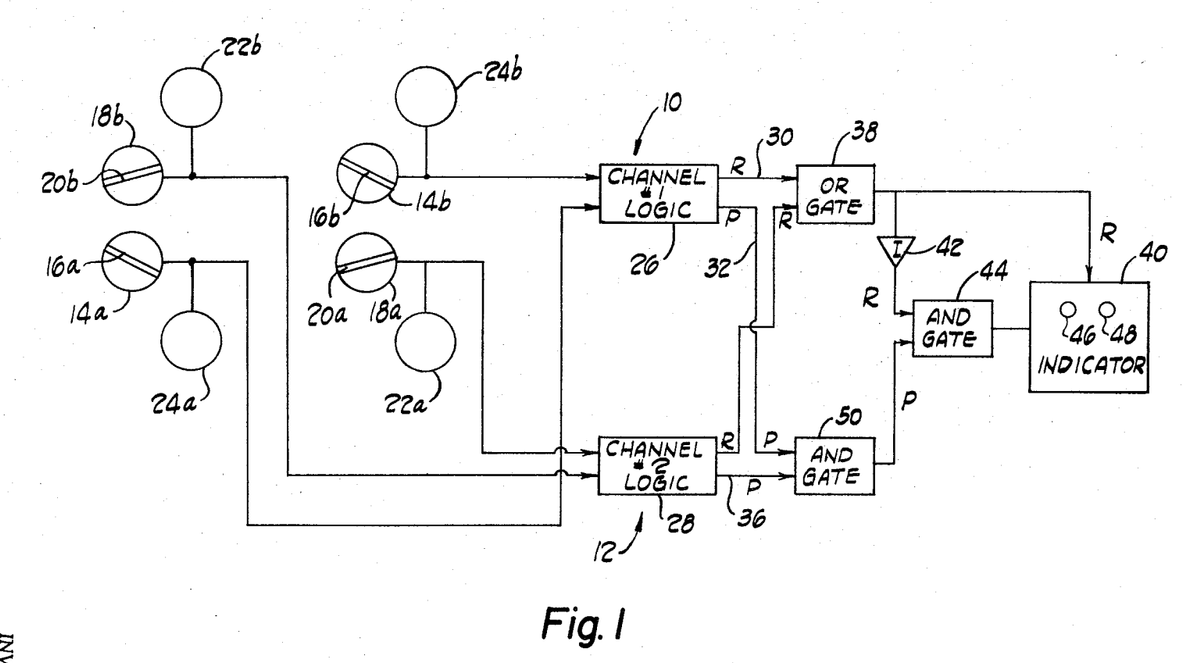
FIG. 1 is a generalized block diagram of typical inspection apparatus to which the invention may apply.

Equipment constructed in accordance with the combined teachings of the present invention and that disclosed in the referenced application comprises two separate but identical data channels, indicated in FIG. 1 by the numerals 10 and 12. The two channels 10, 12 are adapted to inspect and respond to splices having different angular orientations with respect to their direction of travel through the inspection apparatus. For example, in the specific example illustrated, the channel 10 is adapted to respond to splices that slope downwardly from left to right as the material to be inspected passes through the apparatus, and the channel 12 is adapted to respond to splices sloping upwardly from left to right.

In the channel 10, density variations in the material being inspected, such as might be caused by splices, are detected by a pair of photocells 14a, 14b, located respectively near opposite edges of the sides of a tire being inspected. As shown in FIG. 1, a tire being inspected would be arranged to move from the bottom to the top of the figure or vice versa, depending upon the particular equipment design. The photocells 14a, 14b are respectively provided with slits 16a, 16b, whose axes extend in the same direction as the splices those photocells are to detect.

The second channel 12 similarly contains a pair of photocells 18a, 18b having respective slits 20a, 20b whose axes are arranged in the same direction as the splices that those photocells are to detect.

It is pointed out that in the equipment illustrated, in which the photocells 14a, 14b (and 18a, 18b for a different splice) provide signals from the same splice that are displaced in time from each other, it is necessary to delay the first-occurring signal. This will be explained later in connection with FIGS. 4–7. This delay requirement can be eliminated by spacing apart the photocells of each pair so that the two photocells adjacent opposite edges of the material detect a splice of a particular orientation at the same time. This would probably necessitate the use of three X-ray sources, however, and so is not economically justifiable.

The photocells 14a, 14b, 18a, 18b are respectively provided with reference photocells 22a, 22b, 24a, 24b, whose purpose is to minimize changes in the output signals from the photocells 14, 18 due to changes in intensity of an X-ray beam passing through the article under inspection that energizes those photocells. This is explained in detail in the referenced application and will not be dealt with further here.

The signals from the photocells 14a, 14b are provided to first channel logic circuitry 26 and the signals from the photocells 18a, 18b are similarly provided to second channel logic circuitry 28. The logic circuits 26, 28 are identical, and each is capable of providing two output signals indicating "reject" or "pass" conditions of the tire being inspected.

The reject signal from the channel 26 is provided on a lead 30 and the pass signal is provided on a lead 32. The reject signal from the channel 28 is provided on a lead 34 and the pass signal is provided on a lead 36.

The reject signals on the leads 30, 34 are provided as input signals to an OR gate 38 that provides an output signal if there is a reject signal present on either of the leads 30, 34. The output signal of the OR gate 38 is provided to utilization means such as an indicator 40, the through an inverter 42 to an AND gate 44. The indicator 40 may provide a visual indication by means of lights 46, 48 to indicate whether an article being inspected is to be passed or rejected, or it may provide an audible alarm or actuate other apparatus to cause physical rejection or acceptance of the article under inspection.

Pass signals present on the leads 32, 36 are provided as input signals to an AND gate 50, whose output is connected as an input to the AND gate 44. If pass signals are present on both of the leads 32, 36, an output signal will be provided from the AND gate 50 to the AND gate 44. As previously noted, the output signal from the OR gate 38 is inverted by the inverter 42 and also provided as an input to the AND gate 44. This is necessary because, in the particular embodiment of the invention described, it is possible to have both reject and pass signals provided for an article that should be rejected. If a reject signal is present and is inverted by the inverter 42, and a pass signal is also present at the input to the AND gate 44, there will be no output pass signal to the indicator 40. However, if there is no reject output signal from the OR gate 32, the AND gate 44 will provide a pass signal to the indicator 40.

Figure 2:
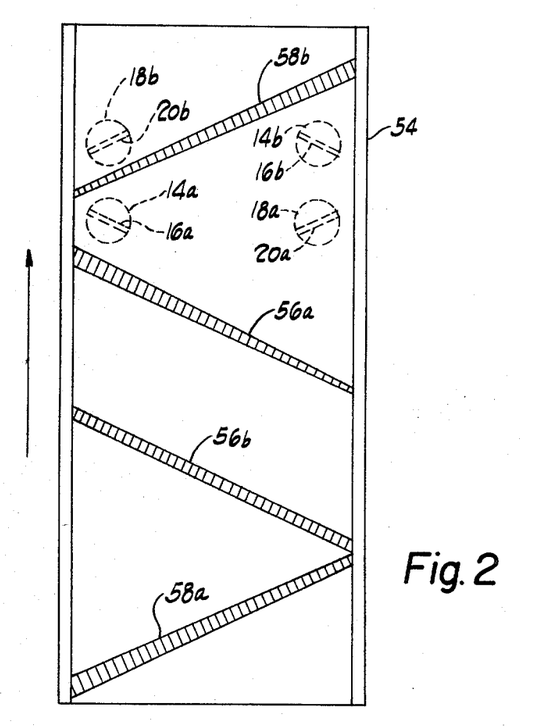
FIG. 2 is a diagrammatic plan view of an article being inspected by the apparatus of FIG. 1.

FIG. 2 illustrates a green two-ply tire 54 that has been cut transversely. The tire 54 contains four splices 56a, 56b, 58a, 58b, the splices 56a, 56b lying in one ply and the splices 58a, 58b lying in the second ply. As shown for purposes of illustration, the splices 58a, 56a and 58b are tapered, and the splice 56b is normal. The tire is assumed to be moving upwardly, as seen in FIG. 2, past the photocells 14, 18.

As shown, the axes of the slits 16a, 16b are substantially parallel to the axes of the splices 56a, 56b. Similarly, the axes of the slits 20a, 20b are substantially parallel to the splices 58a, 58b. Thus, the photocells 14 will respond to the passages of the splices 56, and the photocells 18 will respond to the passage of the splices 58.

Figure 3:
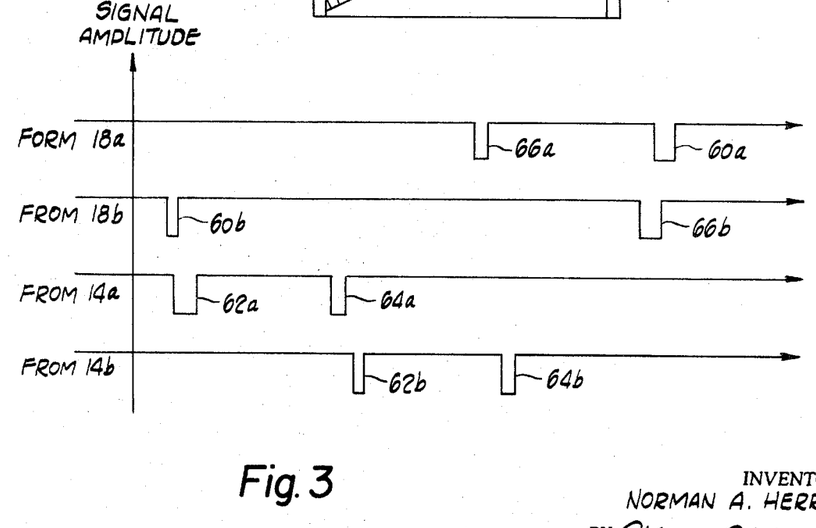
FIG. 3 is an idealized waveform diagram of signals provided in the apparatus of FIG. 1 when inspecting the article shown in FIG. 2.

FIG. 3 illustrates idealized waveforms of the signals produced by the photocells 14, 18 in response to the passage of the splices 56, 58. In point of time, the first signal to be produced is a signal 60b produced by the photocell 18b as the left side of the splice 58b passes across the slit 20b. The second signal to be produced is a wide signal 62a produced by the photocell 14a as the left side of the splice 56a passes across the slit 16a. The photocell 14a is again actuated by passage of the left side of the splices 56b to produce a signal 64a. The photocell 14b then detects passage of the narrow right side of the splice 56a to produce a narrow signal 62b. The next signal to be produced is a narrow signal 66a, caused by passage of the narrow end of the splice 58a past the photocell 18a. This is followed shortly by a signal 64b caused by passage of the righthand edge of the normal splice 56b past the photocell 14b. Next comes a signal 66b produced by the passage of the wide end of the splice 58a past the photocell 18b. This is followed by a signal 60a produced as the wide right end of the splice 58b passes the photocell 18a. The difference in time of occurrence of each pair of signals 60, 62, 64, 66 is indicative of the angle of the splice in the tire 54. However, since the cords whose splices are being measured are machine cut, the angle of the splice is presumed to be substantially constant and the apparatus does not provide means for checking that angle. The apparatus is concerned particularly with inspecting for open splices, splices that are too wide or too narrow and splices that taper to more than a predetermined extent from side to side of the tire.

The outputs of the photocells 18, 20 comprising the signals 60, 62, 64, 66 are connected as inputs to the logic channels 26, 28 shown in FIG. 1. Inasmuch as the logic channels 26, 28 are identical, only one of the channels is shown in block diagram form in FIG. 4 and will be described.

Figure 4:
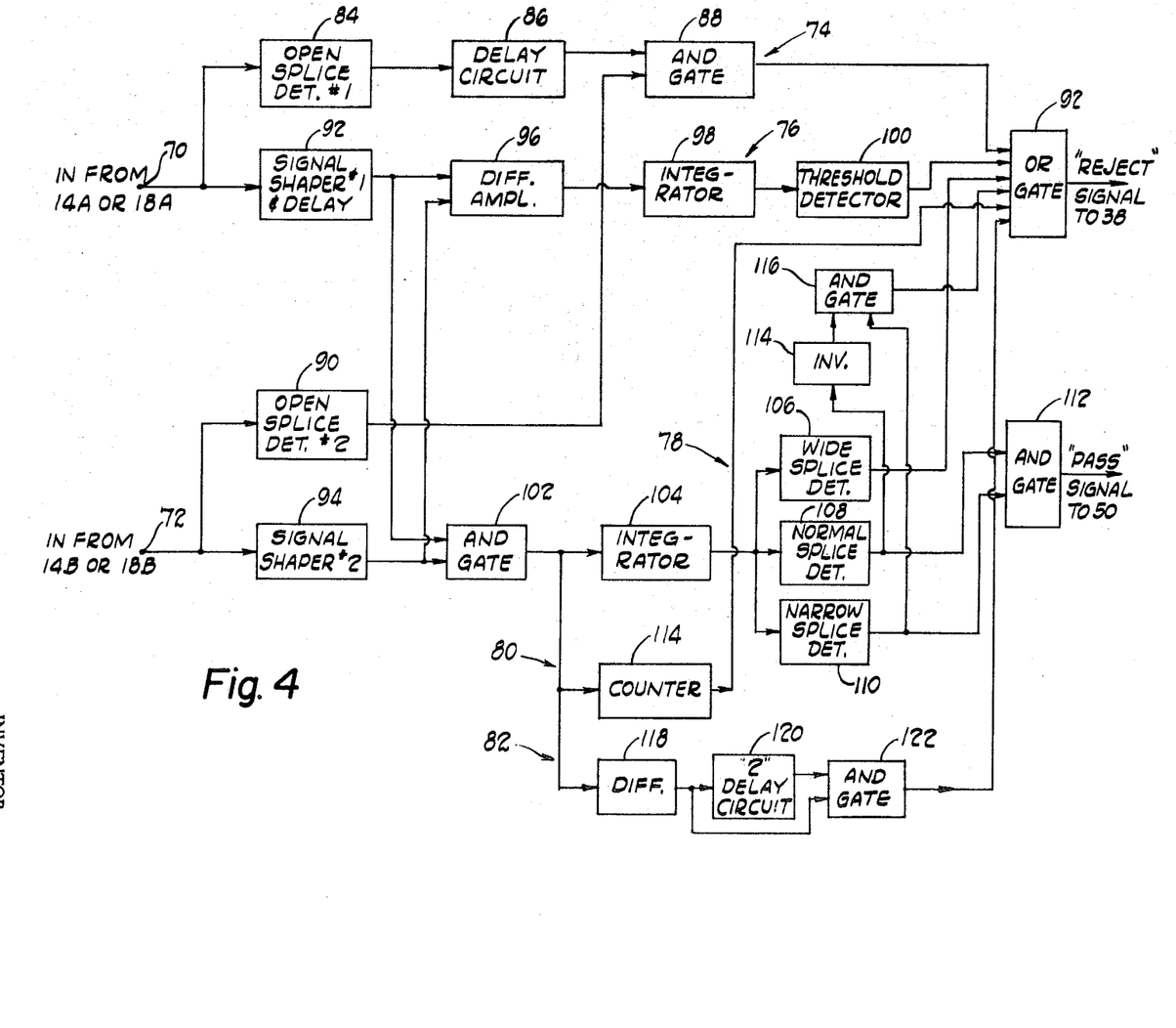
FIG. 4 is a generalized block diagram of one channel of a two-channel circuit embodying the invention.

As seen in FIG. 4, an input signal from one of the photocells 14a or 18a is provided to an input terminal 70, and an input signal from a corresponding photocell 14b or 18b is provided to an input terminal 72. The logic channel is essentially divided into five signal channels. These are an open splice indicating channel 74, a tapered splice indicating channel 76, a width indicating channel 78, a splice number indicating channel 80, and a spacing indicating channel 82. The width channel 78 is, in turn, divided into three sub-channels for detecting wide splices, normal splices, and narrow splices.

An open splice provides a positive-going output signal (indicating a decrease in material density) from the photocell across which it passes. Thus, the open splice channel 74 comprises an open splice detector 84 connected to receive the input signal from the terminal 70 and provide a positive-going output signal at the beginning of the open splice detected by the detector that provides signals to the terminal 70. That signal is delayed by a delay circuit 86 for a predetermined length of time just short of the time required for the trailing edge of the splice to reach the detector that supplies signals to the input terminal 72. At that time, a relatively wide signal is provided to an AND gate 88.

When a positive-going signal is provided to the terminal 72 corresponding to an open splice at the end of what should be a normal splice, it is detected by a second open splice detector 90 which provides a positive-going output signal to a second input of the AND gate 88. When two positive-going signals are simultaneously received by the AND gate 88, indicating an open splice at both ends of what should be a normal splice, the AND gate 88 produces a positive-going pulse which is provided to one input of an OR gate 92. The OR gate 92 has a plurality of inputs all of which are responsive to signals indicating a condition that should cause rejection of the tire being inspected. A signal appearing on any one of the various inputs to the OR gate 92 is transmitted to the OR gate 38 (in FIG. 1) to eventually cause the indicator 40 to indicate a "reject."

The taper indicating channel 76 must of necessity receive input signals from both of the input terminals 70, 72. In order words, the taper indicating channel 76 acts upon the difference in the widths of the negative-going signals provided from the two detectors that are responsive to a particularly oriented splice. To this end, the input signal from the terminal 70 is provided to a circuit comprising a first signal shaper and various delays 92 (to be hereinafter explained in detail), and the input signal from the terminal 72 is provided to a second signal shaper 94. The output of the first signal shaper and delay circuit 92 provides a positive-going pulse whose width is substantially equal to the width of the splice detected by one of the photocells 14a or 14b. The output of the second signal shaper 94 is a positive-going, substantially square-wave signal whose width is substantially equal to the width of the splice detected by one of the detectors 14b or 18b. These two square-wave signals are provided as inputs to a differential amplifier 96 that provides an output signal of a width proportional to the difference in widths of the input signals from the circuits 92, 94. This output signal from the differential amplifier 96 actuates an integrator 98 that provides an output signal whose amplitude varies in proportion to the width of the input signal from the differential amplifier 96. The output signal from the integrator 98 is provided as input to a threshold detector 100. The threshold detector 100 provides an output signal when its input signal from the integrator 98 reaches a predetermined amplitude, which amplitude represents a predetermined amount of taper that is acceptable in a splice passing under the detectors. The output signal from the threshold detector 100 is provided as a second input to the OR gate 92 and, if provided, will cause a reject signal to be provided by the OR gate 92.

The width indicating channel 78 operates on the narrowest of the two splice width signals provided to it from the signal shaper and delay circuit 92 and from the second signal shaper 94. These two signals are supplied as two input signals to an AND gate 102 that supplies an output signal whose width is substantially equal to the width of the shortest signal provided to its two inputs. This signal is provided to an integrator 104. The integrator 104 provides an output signal whose amplitude is proportional to the width of the input signal provided to it from the AND gate 102. This output signal from the integrator 104 is provided to wide, normal, and narrow splice detectors 106, 108, 110. The detectors 106, 108, 110 are conventional threshold detectors that respond to input signals having amplitudes exceeding predetermined levels. The wide splice detector 106 is set to provide an output signal in response to an input signal having a relatively large amplitude. The normal splice detector is set to provide an output signal when the amplitude of its input signal indicates a splice of the narrowest acceptable width. The narrow splice detector 110 is set to provide an output signal in response to a very low amplitude input signal.

An output signal from the wide splice detector 106 is supplied directly as a third input to the OR gate 92 so that a reject signal will be immediately supplied by the OR gate if the splice in the tire is too wide.

Certain other circuitry is necessary in order to differentiate between a normal width splice and a narrow width splice. This occurs because a splice of normal width will actuate both the narrow splice detector 110 and the normal splice detector 108. If output signals are provided from both the normal splice detector 108 and the narrow splice detector 110, they actuate an AND gate 112, which provides a pass signal to the AND gate 50 shown in FIG. 1.

Because the narrow splice detector 110 is actuated in response to a splice of normal width as well as one of narrow width, and it is desirable to reject a tire having a narrow splice but not one having a normal splice, it is necessary to provide additional circuitry between the detectors 108, 110 and the OR gate 92 that will provide a reject signal in response to a narrow splice signal. That circuitry takes the form of an inverter 114 that is connected to receive the output signal from the normal splice detector 108 and invert it. The inverted output of the inverter 114 is applied as one input to an AND gate 116 along with the signal obtained directly from the output of the narrow splice detector 110. If a normal splice is detected, a high signal will be provided by the narrow splice detector and a high signal will be provided by the normal splice detector. However, the signal provided by the normal splice detector 108 will be inverted so that high and low signals will be provided to the AND gate 116, which will provide a low output signal to the OR gate 92. Thus, the OR gate 92 will not respond and provide a reject signal. On the other hand, if a narrow splice is detected, the narrow splice detector 110 will provide a high output signal, while the normal splice detector 108 will provide a low output signal. The low output signal from the normal splice detector 108 will be inverted, so that the AND gate 116 will provide a high output signal to the OR gate 92. Thus, the reject signal will be provided by the OR gate 92.

The fourth or splice number indicating channel 80 of the apparatus shown in FIG. 4 is a counting channel. Its purpose is to insure that there are no more than two splices in any single ply. If there are more than two, the tire is to be rejected. The counting channel 80 comprises a counter 114 that provides a high output signal as a fifth input to the OR gate 92 when three splices are detected in either ply of a tire being inspected.

The fifth channel of the logic circuitry is sensitive to the spacing between consecutive splices in a single ply. This channel comprises a differentiator 118, a delay circuit 120, and an AND gate 122. The differentiator 118 provides a positive-going signal in response to the leading edge of a pulse from the AND gate 102. The delay circuit 120 delays this signal for a period of time equal to the time necessary for the tire under inspection to travel past the photocells a distance of 2 inches. The output of the differentiator 118 is provided directly to one input of the AND gate 122 and the output of the delay circuit 120 is provided to a second input. The output of the delay circuit 120 is a relatively wide pulse whose width is proportional to the length of time it takes a tire to travel 2 inches. Therefore, if at any time while the pulse is being provided from the delay circuit 120 and the AND gate 122, a second pulse is provided by the differentiator 118, indicating the occurrence of a second splice, an output signal is provided by the AND gate 122 to the sixth input of the OR gate 92 to cause it to provide a reject signal.

In the particular case of a tire splice inspection apparatus, it is generally not necessary to know the specific reason for rejecting a tire. However, for quality control or statistical purposes, it may be desirable to know how many tires are being rejected because of open splices, narrow splices, etc. This information can easily be obtained with the circuitry of the invention by providing a counter at the output of each of the reject channels. In other words, six counters would be added to the circuitry shown in FIG. 4. They would be respectively actuated by output signals from the AND gate 88, the threshold detector 100, the wide splice detector 106, the AND gate 116, the counter 114, and the AND gate 122. The OR gate 92 may still be utilized in combination with the counters to provide a reject output signal from the logic channel to the indicator or other utilization device.

Figure 5A:
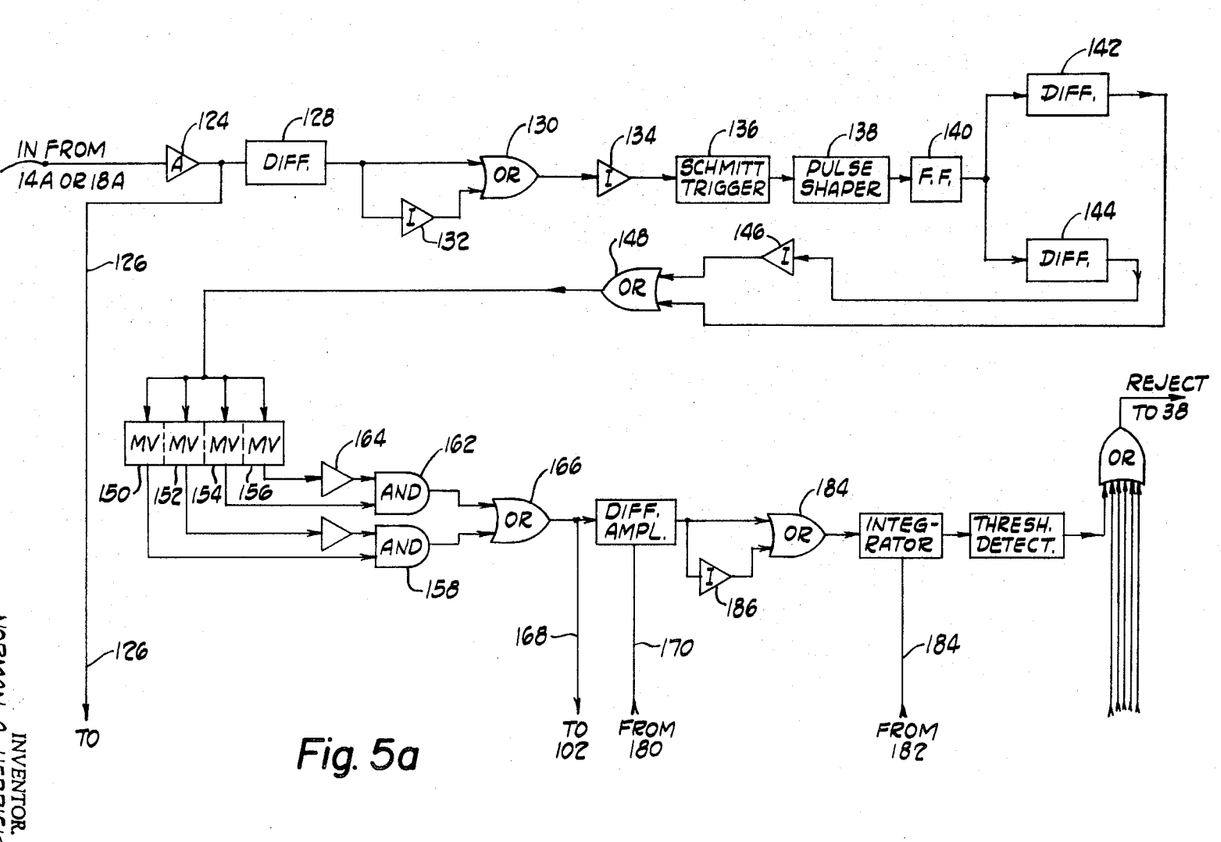
FIGS. 5a and b taken together are a logic diagram of the channel shown in block form in FIG. 4.
Figure 5B:
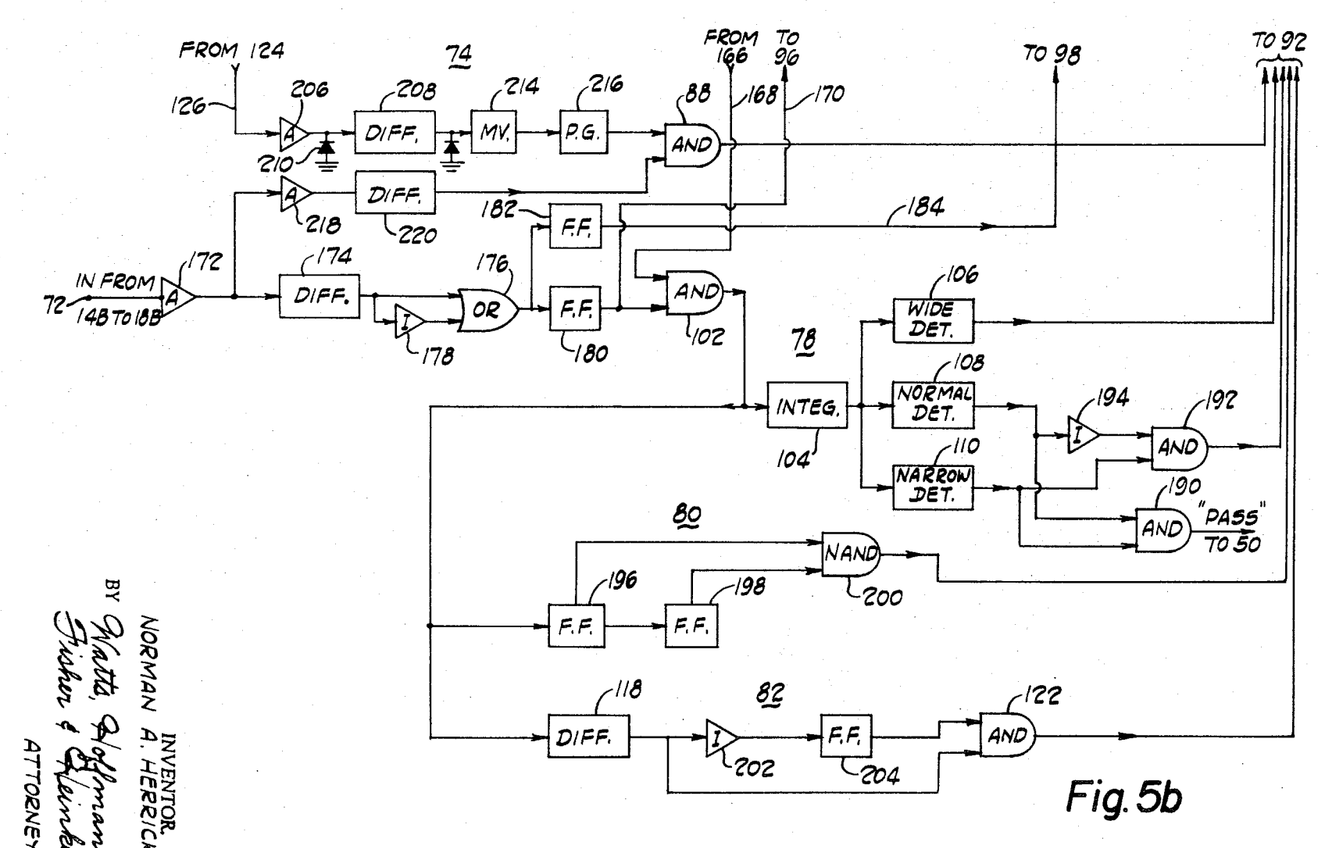

FIGS. 5a and 5b are logic diagrams illustrating more specifically the circuitry shown in block form in FIG. 4. It will be appreciated that there are numerous instances in the logic circuitry shown in FIGS. 5a and b where it appears that the same signals are present both before and after several interposed components. This is necessary because the signals provided by the photocells 14, 18 are not rectangular in shape. In some cases, they may have severely sloping leading edges, while in other cases they may have severely sloping trailing edges. In either case, it is necessary to have wave-shaping circuitry to shape the signals from the photo-sensitive cells into substantially square waves for subsequent processing by the logic circuitry of the invention.

Specific circuitry embodied in the various logic elements is well-known in the art, and so will not be shown. Typical circuits may be found in a book entitled "Pulse, Digital and Switching Waveforms" by Millman and Taub, published by McGraw-Hill Book Company, New York, N.Y. (1965). They are also illustrated and described in many other publications.

FIG. 5a shows the detailed logic circuitry comprising the tapered splice indicating channel 76, as well as the final OR gate 92 to which all of the various reject signals are provided. The input signal from one of the photocells 14a or 18a provided to the input terminal 70 is amplified by a linear amplifier 124. The amplifier 124 does not invert the input signal, and at its output provides a positive-going signal in response to an open splice on a lead 126 and also to a differentiator 128. The lead 126 is connected into the open splice detecting channel 74 shown in detail in FIG. 5b.

The differentiator 128 conventionally differentiates the negative-going pulse supplied to it from the amplifier 124 originating from a closed splice and provides positive-going and negative-going output signals. These signals are provided to an OR gate 130 and to an inverter 132, the output of the inverter 132 also being connected as an input to the OR gate 130. The reason for using the inverter 132 is that the OR gate 130 is arranged to pass only positive-going signals. Thus, the inverter 132 inverts the negative-going signal from the differentiator so that the output of the OR gate 130 comprises two negative-going pulses spaced apart by the width of the signal supplied to the input terminal 70. These negative-going signals are inverted by an inverter 134 and utilized to actuate a conventional Schmitt trigger circuit 136. The Schmitt trigger circuit 136 provides two positive-going signals to a pulse shaper 138. The leading edges of the two input signals to the pulse shaper 138 are spaced apart by the width of the splice detected represented by the signal and provided to the input terminal 70. The pulse shaper 138 serves to sharpen the pulses provided to it from the trigger circuit 136 and supplies the sharpened pulses to a conventional bi-stable flip-flop 140. The flip-flop 140 provides a positive-going square-wave signal, whose width is equal to the width of the detected splice, to two conventional differentiators 142, 144. The differentiators 142, 144 provide positive-going and negative-going output signals corresponding in time to the leading and trailing edges of the square-wave input signal from the flip-flop 140. The output pulses from the differentiator 144 are inverted by an inverter 146. The inverted pulses from the inverter 146 are provided as one input to an OR gate 148, and the pulses from the differentiator 142 are provided directly to another input to the OR gate 148. The OR gate 148 is adapted to respond only to positive-going input pulses, so that the output of the OR gate 148 consists of two positive-going signals spaced apart by a distance equal to the width of the detected splice.

It will be recalled that, in connection with the description of the block diagram of FIG. 4, it was stated that the signal at the input terminal 70 is delayed for a predetermined length of time to enable its leading edge to coincide substantially with the leading edge of the pulse provided to the terminal 72. In other words, the pulse derived from the leading edge of the splice is delayed in time to coincide with that derived from the leading edge of the splice at the opposite side of the tire. This delay, for the particular example described, is equal to a travel of the tire of approximately 6 inches. Therefore, if, while a first signal supplied to the terminal 70 is being delayed for the required time, and a second signal due to a second splice is provided to that terminal, the circuitry will be inoperative to respond to the signal due to the second splice. Therefore, as shown in FIG. 5a, a plurality of time delays are provided so that splices occurring less than 6 inches apart will still be detected.

As shown in FIG. 5a, the time delays take the form of four one-shot multivibrators, 150, 152, 154, 156, each of which provides a positive-going output pulse having a width equal to the time difference between the occurrences of the two input pulses at the terminals 70, 72, in other words, a time equal to about 6 inches of tire travel. The multivibrators 150, 152, 154, 156 are also serially connected to inhibit each other. That is, the multivibrator 152 cannot be triggered until after the multivibrator 150 has been triggered; the multivibrator 154 cannot be triggered until after the multivibrator 152 has been triggered; and the multivibrator 156 cannot be triggered until after the multivibrator 154 has been triggered. This means that a series of four input pulses from the OR gate 148 indicating the presence of two splices will consecutively actuate the multivibrators 150–156 to provide four output signals each having a width corresponding to a 6 inch time delay. The output signal from the first multivibrator 150 is provided directly to one input of an AND gate 158. The output of the multivibrator 152 is inverted by an inverter 160 and provided to a second input of the AND gate 158. Thus, the output signal from the AND gate 158 will be a positive-going square-wave whose width is equal to the width of a first splice detected, but which is delayed in time to coincide with another such signal provided to the terminal 72 from the detector adjacent the opposite edge of the tire.

Similarly, the output signal from the multivibrator 154 is provided directly to one input of an AND gate 162. The output signal from the multivibrator 156 is inverted by an inverter 164 and supplied to a second input of the AND gate 162. Thus, the output of the AND gate 162 will be a positive-going square-wave signal having a width equal to that of the detected splice, but delayed in time in the same fashion as the pulse from the AND gate 158. This pulse would represent a second splice detected during the time that the first splice is being delayed.

The outputs of the two AND gates 158, 162 are provided as inputs to an OR gate 166. The OR gate 166 serves merely as a combining device to provide its two input signals to one input of the differential amplifier 96 previously mentioned, and to supply the same signals on a lead 168 to the AND gate 102 shown in FIGS. 4 and 5b. The differential amplifier 96 receives a second input signal on a lead 170, which signal it compares in width with the signal received from the OR gate 166. Before proceeding further with a description of the splice taper indicating channel shown in FIG. 5a, consider the derivation of the signal present on the lead 170.

As shown in FIG. 5b, a second input signal is supplied to the terminal 72 from the photocell 14b or the photocell 18b. This signal is amplified by a linear, non-inverting amplifier 172 and provided as an input signal to a differentiator 174. The output of the differentiator 174, which consists of positive-going and negative-going spikes corresponding to the leading and trailing edges of the input signal, is provided as one input to an OR gate 176. The output signals from the differentiator 174 are also inverted by an inverter 178 and provided to a second input of the OR gate 176. The OR gate 176 is responsive only to positive-going pulses, so that its output will consist of two positive-going pulses corresponding in time to the leading and trailing edges of the input pulse to the differentiator 174. The output pulses from the OR gate 176 are utilized to trigger a conventional bimstable flip-flop 180, which provides an essentially square, positive-going output signal whose width is equal to the width of the splice being detected. That output signal is provided on the lead 170 to an input of the differential amplifier 96 shown in FIG. 5a.

The first positive-going output signal of each pair of such signals from the OR gate 176 also triggers a conventional one-shot flip-flop 182. That flip-flop provides a positive-going, square-wave output signal on a lead 184 to the integrator 98 shown in FIG. 5a. The width of that pulse is somewhat greater than the maximum anticipated width of a splice and is used to actuate the integrator 98 for a limited period of time.

The output of the differential amplifier 96 shown in FIG. 5a is a substantially square pulse, whose width is equal to the difference in widths of the two input signals respectively supplied from the OR gate 166 and the flip-flop 180. This signal may be either positive or negative, depending on which of the two input signals is longer. For example, if the signal supplied from the OR gate 166 is longer than the signal supplied from the flip-flop 180, the output signal of the differential amplifier 96 may be positive. Conversely, if the signal from the flip-flop 180 is longer than that from the OR gate 166, the output signal of the differential amplifier may be negative.

The output signals from the differential amplifier 96 are provided to one input of an OR gate 184, which is adapted to provide an output signal only in response to a positive-going input signal. Therefore, in order to insure that both positive and negative output signals from the differential amplifier 96 are passed by the OR gate 184, those output signals are inverted by an inverter 186 and provided to a second input of the OR gate 184. Thus, the output of the OR gate 184 will be a positive-going signal, whose width is indicative of the amount of taper of the splice from one side of the tire to the other. Of course, if the splice is not tapered, there will be no output from the differential amplifier 96 and hence no output from the OR gate 184.

The positive-going output signal from the OR gate 184 is provided as an input signal to the integrator 98. The integrator 98 is gated by the signal provided on the lead 184 from the flip-flop 182, previously mentioned in connection with FIG. 5b. The integrator 98 provides a ramp output signal whose maximum amplitude is dependent upon the width of the input signal from the OR gate 184. Thus, the maximum amplitude of the output signal of the integrator 98 is proportional to the amount of taper of a splice being inspected. That output signal is supplied to the threshold detector 100, which is actuated to provide an output signal when the amplitude of the signal from the integrator 98 reaches a predetermined level. The level at which the threshold detector 100 provides an output signal may be adjusted to pass a splice having a slight taper and to reject a splice having more than a desired amount or degree of taper. The output signal from the threshold detector 100 is provided to the OR gate 92 as previously mentioned, which will provide a reject signal to the OR gate 38 (FIG. 1) in response to that signal from the threshold detector 100.

Consider now the splice width detecting channel 78 shown in detail in FIG. 5b. Input to that channel from the AND gate 102, which receives input signals from the flip-flop 180 and from the OR gate 166. The AND gate 102 provides a positive-going output signal whose width is equal to the narrowest of its two input signals. That signal is integrated by the integrator 104 to provide a ramp output signal whose maximum amplitude is proportional to the width of the input signal. That ramp signal is provided to the wide splice detector 106, the normal splice detector 108, and the narrow splice detector 110.

The splice detectors 106, 108, 110 are conventional level or threshold detectors, which are respectively adjusted to respond to large, medium and small amplitude input signals. A very wide splice will produce a signal from the integrator 104 having a large amplitude, which will actuate all three of the detectors 106, 108, 110. When the detector 106 is actuated, it provides a reject output signal from that gate. Whether or not the detectors 108, 110 are actuated is immaterial, because the output signal from the wide splice detector 106 will override any simultaneously occurring pass signal, as previously explained in connection with FIG. 1.

The signal provided from the integrator 104 in response to the detection of a splice of normal width will actuate not only the normal splice detector 108, but will also actuate the narrow splice detector 110. The signals from the detectors 108, 110 are provided as two inputs to an AND gate 190. The AND gate 190 provides a pass signal to the AND gate 50 (FIG. 1) only when signals are received from both detectors 108, 110. Thus, a narrow splice alone will not provide an output signal from the gate 190.

Inasmuch as it is desired to provide a reject signal in response to detection of a narrow splice, but not in response to detection of a normal splice, the output of the narrow splice detector 110 is also provided as one input to another AND gate 192. The output of the normal splice detector 108 is inverted by an inverter and provided to a second input of the AND gate 192. Thus, if there is an output signal from both detectors 108, 110, the AND gate 192 will provide no output signal. Conversely, if there is a high output signal from the narrow splice detector 110 and a low output signal from the normal splice detector 108, the AND gate 192 will receive two high inputs and provide an output signal to the OR gate 92, indicating a reject because of a narrow splice.

The splice number indicating channel 80 comprises a pair of flip-flops 196, 198 and a NAND gate 200. The flip-flops 196, 198 are of conventional, bi-stable design and are connected in series as the first two elements of a binary counter. The flip-flop 196 receives an input signal from the AND gate 102 indicative of a splice, which causes it to change state. In its original state, the flip-flop 196 is providing a high output signal to one input of the NAND gate 200, and the flip-flop 198 is similarly providing a high input signal to the second input of the NAND gate 200. Therefore, the gate 200 provides a low output signal. When a signal is received by the flip-flop 196 from the AND gate 102, it changes state and provides a low output signal to the NAND gate 200, while the signal from the flip-flop 198 remains high. Thus, the NAND gate 200 still provides a low output. When a second input signal is received by the flip-flop 196, it provides a high output signal to the NAND gate 200 and actuates the flip-flop 198 to cause it to provide a low output signal. Again, the NAND gate 200 provides a low output signal. If a third splice occurs, it causes the flip-flop 196 to reverse its condition and provide a low output signal to the NAND gate. At that time, the NAND gate 200 will be receiving two low output signals and hence will provide a high output signal to the OR gate 92 to indicate a reject because of more than two splices.

As previously mentioned, the spacing indicating channel 82 includes a differentiator 118 that receives an input pulse from the AND gate 102. The differentiator 118 provides positive and negative-going signals coincident in time with the leading and trailing edges of the pulse received from the AND gate. The delay circuit 120 shown in FIG. 4 comprises an inverter 202 and a conventional one-shot flip-flop 204 shown in FIG. 5b. A negative-going or second output pulse from the differentiator 118 is inverted and triggers the flip-flop 204 to provide a positive-going output pulse having a width equal to the time required for the tire being inspected to travel approximately 2 inches. That signal is provided as one input to the AND gate 122. If now, a second signal is received by the differentiator 118 before the termination of the signal from the flip-flop 204, a positive-going signal will be provided to the second input of the gate 122, which will cause it to provide a positive-going output signal to the OR gate 92 indicating that two splices have occurred less than 2 inches apart.

Although no means for resetting the various flip-flops shown in FIGS. 5a and 5b have been shown or described, it will be understood by one skilled in the art that those flip-flops would be reset to their original conditions at the beginning of each inspection cycle. Reset signals may be provided in a conventional manner from the control circuitry for the inspection apparatus.

The open splice indicating channel 74 is shown in detail in FIG. 5b. It comprises a non-inverting amplifier 206 that receives and amplifies a positive-going input signal provided on the lead 126. The output signal of the amplifier 206 is differentiated by a differentiator 208. Diodes 210, 212, are so connected at the output of the amplifier 206 and the differentiator 208, respectively, as to remove any negative-going portions of the output signals from either of those elements. The positive-going output pulse from the differentiator 208 is provided to a one-shot delay multivibrator 214. The multivibrator 214 provides a positive-going output pulse whose width is somewhat less than the time anticipated between receipt of respective input pulses at the terminals 70, 72. The trailing edge of the output pulse from the multivibrator 214 is utilized to trigger a pulse generator 216. The pulse generator 216 may be a conventional one-shot multivibrator that provides a positive-going square-wave output signal during that time period when it is anticipated a signal may be received at the input terminal 72. The output signal of the pulse generator 216 is provided to one input of the AND gate 88.

The second open slice indicating signal is provided from the output of the amplifier 172 to the input of another non-inverting amplifier 218. A differentiator 220 differentiates the output signal from the amplifier 218 to provide positive-going and negative-going pulses respectively coincident in time with the leading and trailing edges of the input signal to the terminal 72. The output pulses from the differentiator 220 are provided to a second input of the AND gate 88. If the positive-going pulse from the differentiator 220 occurs at the same time as the positive-going output pulse from the pulse generator 216, the AND gate 88 provides a positive-going output pulse to the OR gate 92 to indicate an open splice and hence rejection of the tire.

Figure 6:
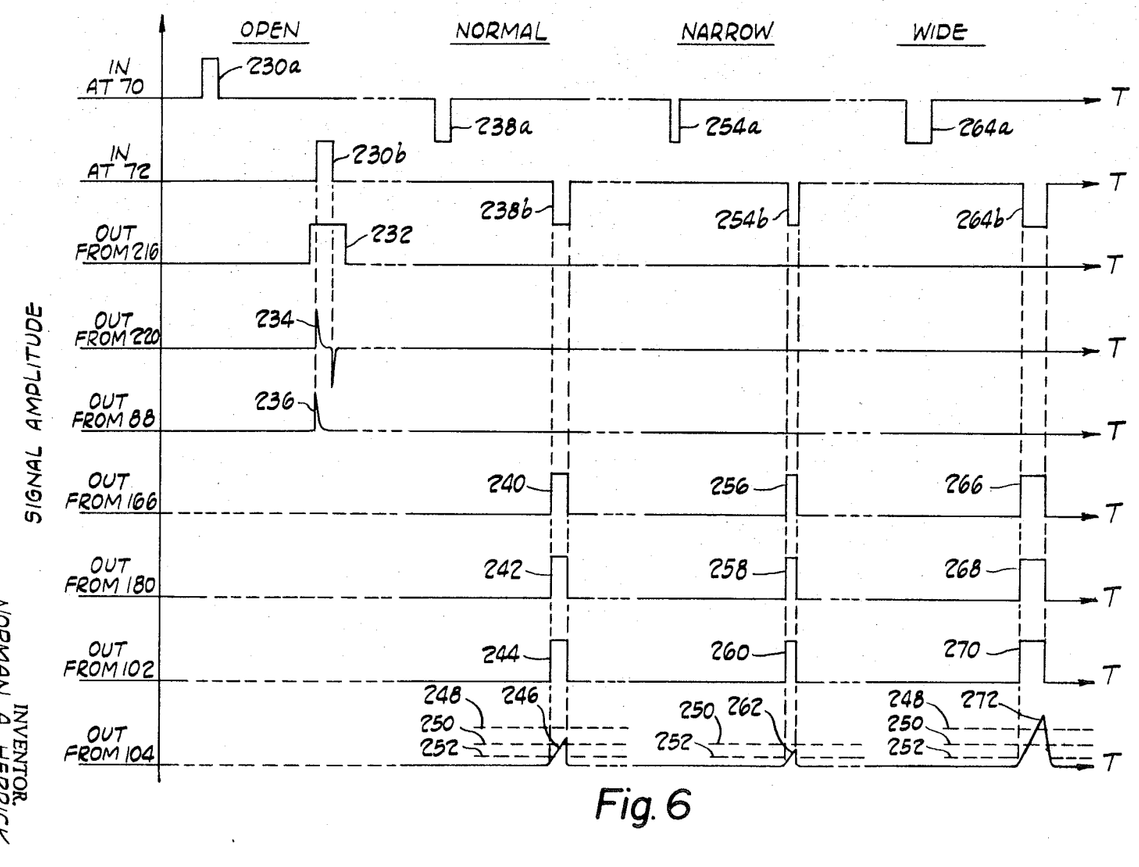
FIGS. 6 and 7 are diagrams showing signals present at various points in the logic diagram of FIGS. 5a and b, and particularly illustrating relative times of occurrences and duration of those signals.
Figure 7:
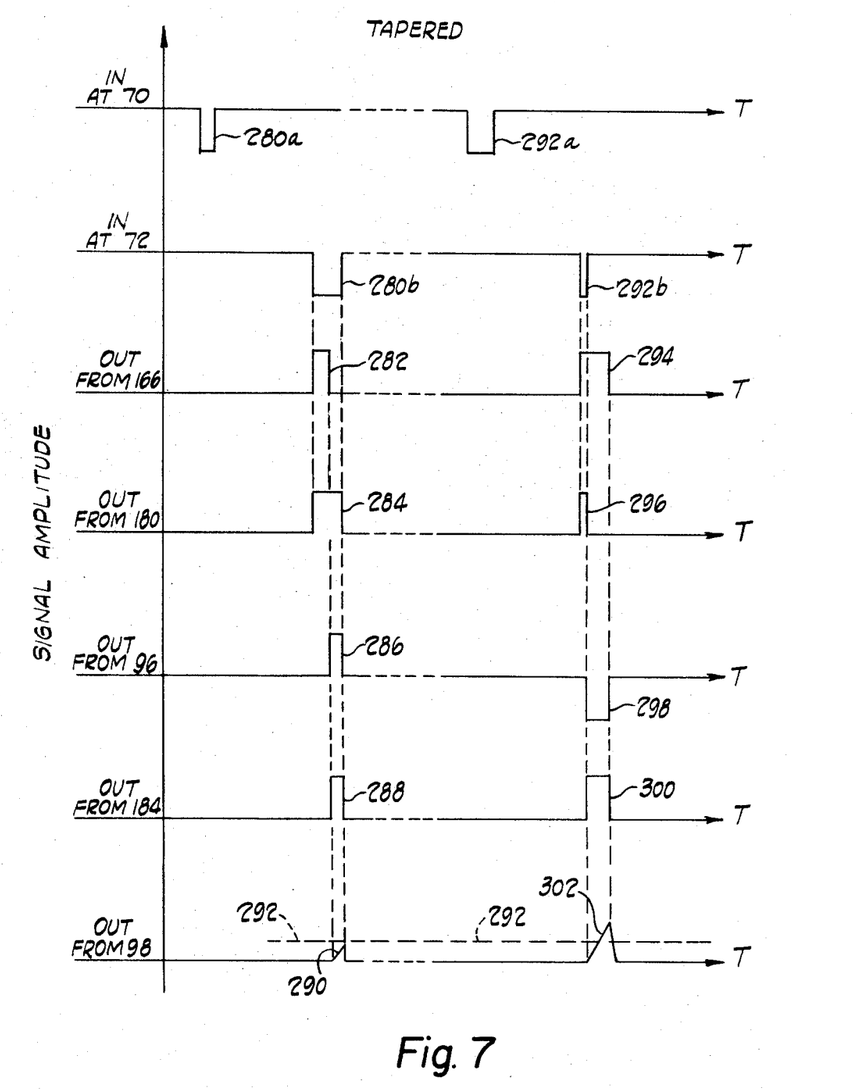

Operation of the circuitry in response to detected splices of various types can best be understood by reference to FIGS. 6 and 7, taken in conjunction with FIG. 5. It is pointed out that the wave-forms shown in those figures are quite idealized. For example, all of the signals with the exception of ramp signals are shown as square waves. It would be quite apparent to one skilled in the art that the input signals at the terminals 70, 72 from the photocells are far from being square waves. However, for purposes of illustrating the operation of this circuitry, it is most convenient to show them as square waves.

An open splice will produce positive-going signals 230a, 230b at the input terminals 70, 72, respectively. The signal 230a is amplified, differentiated and delayed. Its delayed leading edge is used to trigger the pulse generator 216 to provide a positive-going pulse 232. The input pulse 230b is amplified and differentiated to provide a positive-going spike 234 coincident with its leading edge. The signals 232, 234 are provided to the AND gate 88, which provides an output signal 236 coincident in time with the input signal 234. The signal 236 is provided to the OR gate 92 and hence to the indicator 40 to indicate a reject.

The other channels of the logic circuitry will also provide various signals in response to the positive-going, open splice indicating input signals. The signals produced in those other channels are of no consequence, however, because the reject signal provided from the AND gate 88 is, by itself, sufficient to cause a reject indication.

When a splice is detected, as was previously explained, the input signals provided to the terminals 70, 72 are negative-going. These will produce no output from the open splice indicating channel 74, because such negative-going signals will be shorted to ground by the diode 210 and hence the pulse generator 216 will not provide an output pulse to the AND gate. Therefore, any signals provided from the differentiator 220 will not pass through the AND gate 88.

A normal splice detected will produce at the input terminals 70, 72 negative-going signals such as those typified at 238a, 238b in FIG. 6. Those signals are of substantially the same width, and the signal 238b occurs at a predetermined time after the signal 238a due to the diagonal orientation of the splice across the tire. The signal 238a is shaped and delayed and provided at the output of the OR gate 166 as a pulse 240 occurring at substantially the same time as the pulse 238b. The pulse 238b is likewise shaped and provided as a positive-going pulse 242 from the flip-flop 180. The pulses 240, 242 are provided to the AND gate 102, which in turn provides an output pulse 244 equal in width to the narrowest of the input signals 240, 242. In the present case, the signals 240, 242 are substantially the same width so that the output pulse 244 is of corresponding width. The output pulse 244 is integrated by the integrator 104 to provide a ramp output signal 246. The signal 246 is provided to the wide splice detector 106, the normal splice detector 108, and the narrow splice detector 110. Those three detectors may be respectively set to detect input signals whose amplitudes exceed three different levels indicated by broken lines 248, 250, 252. It apparent from FIG. 6 that the normal splice signal 246 will exceed the levels 250, 252, but not the level 248. Therefore, the normal splice detector 108 and the narrow splice detector 110 will provide output signals which, in turn, will provide no reject signal from the AND gate 192, but will provide a pass signal from the AND gate 190.

A narrow detected splice will produce relatively narrow input signals 254a, 254b at the input terminals 70, 72, respectively. After suitable shaping and delay, the pulse 254a produces a pulse 256, and the pulse 254b is shaped to provide a pulse 258. In response to the positive-going pulses 256, 258, the AND gate 102 produces a narrow pulse 260, which is integrated by the integrator 104 to provide a small-amplitude ramp output signal 262. It is seen that the signal 262 is of sufficient amplitude to exceed the level 252, but not to exceed either of the levels 248, 250. Thus, the narrow splice detector 110 will provide an output signal which will be passed by the AND gate 192 and provided to the OR gate 92 as a reject signal.

A wide detected splice will produce relatively wide negative-going input signals 264a, 264b. The signal 264a is shaped and delayed to provide a positive-going signal 266, and the signal 264b is shaped to provide a positive-going signal 268. These two signals supplied to the AND gate 102 cause it to provide a relatively wide positive-going output signal 270. The signal 270 is integrated to provide a relatively high-amplitude output signal 272, whose amplitude exceeds all three levels 248, 250, 252. This will cause all three of the detectors 106, 108, 110 to provide output signals. However, the signals provided by the normal splice detector 108 and the narrow splice detector 110 are of no consequence, because the pass signal from the AND gate 190 caused by those two signals will be overridden by the reject signal from the wide splice detector 106. This was previously explained in connection with FIG. 1.

FIG. 7 illustrates the operation of the circuitryp112 in response to two splices that are tapered in opposite directions. A splice that is tapered in one direction may the circuitry a relatively narrow signal 280a at the input terminal 70, and a relatively wide signal 280b at the input terminal 72. The signal 280a is shaped and delayed to provide a narrow positive-going signal 282 at the output of the OR gate 166. The signal 280b is similarly shaped to provide a positive-going wide signal 284 at the output of the flip-flop 180. These two signals are provided to the differential amplifier 96, which is response thereto provides a positive-going output signal 286. The width of the signal 286 is equal to the difference in widths of the signals 282, 284. The signal 286 is passed by the OR gate 184 in the form of a positive-going signal 288. The signal 288 is then integrated by the integrator 98 to provide a relatively small ramp signal 290. The signal 290 is provided to the threshold detector 100. If it is assumed that the detection level of the detector 100 is as indicated by a broken line 292, the detector will provide no output signal. In other words, the amount of taper of the splice that caused the signals 280a, 280b is insufficient to cause rejection of the tire.

A splice that is tapered in the other direction may provide a relatively wide signal 292a at the input terminal 70 and a relatively narrow signal 292b at the input terminal 72. The signal 292a is suitably shaped and delayed and provided at the output of the OR gate 166 as a wide positive-going signal 294. The signal 292b is also shaped and provided at the output of the flip-flop 180 as a narrow positive-going signal 296. The differential amplifier 96 receives the two signals 294, 296 and, in this case, provides a negative-going output signal 298. Of course, the width of the signal 298 is equal to the difference in widths of the signals 294, 296. The signal 298 is inverted by the inverter 186 and then passed by the OR gate 184 in the form of a positive-going signal 300. This signal is integrated by the integrator 98 to provide a ramp output signal 302. As shown, the amplitude of the signal 302 exceeds the threshold level 292 set into the threshold detector 100 so that a positive-going output signal is provided from the detector 100 to the OR gate 92 to indicate a reject condition.

It can now be seen that the general objective of the invention has been obtained. Logic circuitry embodying the invention provides means for detecting splices that are open, of normal width, too narrow, too wide, or tapered to too great an extent. In addition, it enables detection of more than a predetermined number of splices, and detection of splices that are spaced apart by less than a predetermined distance. Although only one embodiment of the invention has been shown and described, it is apparent that many changes and modifications may be made by one skilled in the art without departing from the true spirit and scope of the invention.

I claim:

1. In an X-ray inspection apparatus for detecting changes in density of a material passing therethrough and occurring transversely of a path of travel of said material, said apparatus having X-ray source means and at least two X-ray responsive elements located near opposite edges of said material along said path of travel of said material for receiving X-rays from said X-ray source means and respectively providing at least first and second electrical signals in response to passage of a portion of increased density and respectively providing third and fourth signal in response to passage of a portion of decreased density, and including logic circuitry comprising:

comparator means responsive to relative time durations of said first and second signals for providing a fifth electrical signal having a value representative of the time duration of the signal of said first and second signals having the shortest time duration; and, monitoring means connected to receive said fifth signal for providing a reject signal when the value of said fifth signal is less than a predetermined value.

2. The combination of claim 1, wherein said monitoring means includes circuit means for also providing a reject signal when the value of said fifth signal exceeds a second predetermined value greater than said first predetermined value.

3. The combination of claim 2 wherein said monitoring means also includes second circuit means for providing a pass signal when the value of said fifth signal is equal to said first predetermined value.

4. The combination of claim 3 including utilization means connected to said monitoring means for responding to the presence of said reject signal.

5. The combination of claim 4 including timing means responsive to successive occurrences of said fifth signal for providing said reject signal when the time duration between successive fifth signals is less than a predetermined time to thereby indicate that two said portions of increased density occur less than a predetermined distance apart.

6. The combination of claim 4 including counting means responsive to successive occurrences of said fifth signal for providing said reject signal in response to more than a predetermined number of said successive fifth signals.

7. The combination of claim 1 including second comparator means responsive to relative time duration of said first and second signals for providing a sixth electrical signal having a value representative of the difference in time duration between said first and second signals; and, second monitoring means connected to receive said sixth signal and provide a reject signal when the value of said sixth signal exceeds a predetermined value.

8. In an inspection apparatus for detecting changes in radiation transparency of a material passing therethrough and occurring transversely of a path of travel of said material, said apparatus having radiation source means and at least two radiation responsive elements located near opposite edges of said material along said path of travel of said material for receiving radiation from said source means passing through said material and respectively providing at least first and second electrical signals in response to passage of a portion of said material of different radiation transparency, comparator means responsive to the time duration of said first and second electrical signals for providing an output signal having a value representative of the value of the difference between the time duration of said first and second electrical signals, and detector means responsive to said output signal for providing a reject electrical signal when the value of said output signal lies outside of a predetermined range.

9. In an inspection apparatus for detecting changes in radiation transparency of a material passing therethrough and occurring transversely of a path of travel of said material, said apparatus having radiation source means and at least two radiation responsive elements located near opposite edges of said material along said path of travel of said material for receiving radiation through said material from said source means and respectively providing at least first and second electrical signals in response to passage of a portion of said material of decreased radiation transparency, logic circuitry comprising:

comparator means responsive to relative widths of said first and second signals for providing a third electrical signal proportional in amplitude to width of a narrowest of said first and second signals; and, amplitude-sensitive means connected to receive said third signal and provide a reject signal when the amplitude of said third signal lies outside of a predetermined amplitude range.

10. A radiation inspection apparatus for detecting defects in an article having portions of different densities by measuring the densities of the article as the article passes along a path of travel and comprising a source of radiation, first and second radiation responsive elements positioned along said path of travel for receiving radiation from said source of radiation; said first and second radiation responsive elements each including detector circuit means for respectively developing first and second electrical signals upon the passage of a portion of a said article having a density which exceeds a predetermined level, and logic circuit means coupled to said detector circuit means and having circuit means for developing a third signal in response to the coincident receipt of said first and second signals and circuit means for developing a fourth signal in response to the receipt of only one of said first and second signals.

11. An apparatus as defined in claim 10 including indicator means coupled to said logic circuit means for providing an output indication upon the receipt of a fourth signal to thereby provide an indication of a defect in a said article.

12. An apparatus as defined in claim 10 wherein said detector circuit means each include circuit means for respectively developing said first and second electrical signals for a time duration representative of the time duration at which said portion of a said article having a density which exceeds a predetermined level passes between said source of radiation and the corresponding detector circuit means; said indicator means includes comparator means responsive to relative time durations of said first and second signals for providing a third electrical signal having a value representative of the time duration of the signal of said first and second signals having the shortest time duration; and monitoring means connected to receive said third signal for providing a reject signal when the value of said third signal is less than a predetermined value.

13. The combination of claim 12, wherein said monitoring means includes circuit means for also providing a reject signal when the value of said third signal exceeds a second predetermined value greater than said first predetermined value.

14. The combination of claim 13, wherein said monitoring means also includes second circuit means for providing a pass signal when the value of said third signal is equal to said first predetermined value.

15. The combination of claim 14 including timing means responsive to successive occurrences of said third signal for providing said reject signal when the time duration between successive third signals is less than a predetermined time to thereby indicate that two said portions of increased density occur less than a predetermined distance apart.

16. The combination of claim 14 including counting means responsive to successive occurrences of said third signal for providing said reject signal in response to more than a predetermined number of said successive third signals.

17. In a tire inspection system for inspecting splices in a tire, an improved detection system comprising:
   a. a source of penetrating radiation;
   b. first and second spaced detectors each positioned to receive said radiation and for emitting a first detection signal upon the receipt of a first quantum level of energy and a second detection signal upon the receipt of a second quantum level of energy having a value less than said first quantum level of energy;
   c. first circuit means coupled to said first detector for developing an output signal upon the receipt of a said first detection signal;
   d. timing circuit means coupled to said first circuit means for developing a first reference signal at a predetermined period of time after the receipt of a said output signal from said first circuit means;
   e. second circuit means coupled to said second detector for developing a second reference signal upon receipt of a said first detection signal; and,
   f. logic circuit means for, upon receipt of a said first and second reference signal, developing a reject signal indicating that an open splice has been detected by said first and second detectors.

18. An apparatus as defined in claim 17 wherein said logic circuit means includes gate circuit means for developing a control signal upon substantially simultaneous receipt of a said first and second reference signal.

19. An apparatus as defined in claim 18 wherein said logic circuit means includes a second gate circuit means for developing a said reject signal upon receipt of a said control signal.

20. In a tire inspection system for inspecting splices in a tire, an improved detection system comprising:
   a. a source of penetrating radiation;
   b. first and second spaced detectors each positioned to receive said radiation and for emitting a first detection signal upon the receipt of a first quantum level of energy and a second detection signal upon the receipt of a second quantum level of energy having a value different than said first quantum level of energy;
   c. first circuit means coupled to said first detector for developing a first reference signal having a value representative of the time duration of said second detection signal developed by said first detector;
   d. second circuit means coupled to said second detector for developing a second reference signal having a value representative of the time duration of said second detection signal developed by said second detector;
   e. comparator circuit means coupled to said first and second circuit means for developing an output signal having a value representative of the difference between the value of said first and second reference signals; and,
   f. reject circuit means coupled to said comparator circuit means for developing a reject signal upon receipt of a said output signal having a value different than a predetermined value indicating that a splice has an unacceptable taper.

21. An apparatus as defined in claim 20 wherein said reject circuit means includes an integrator circuit means for developing a control signal having an amplitude representative of the value of a said output signal.

22. An apparatus as defined in claim 21 wherein said reject circuit means includes a gate circuit for developing a reject signal upon receipt of a said control signal having an amplitude less than a preselected value.

23. In a tire inspection system for inspecting splices in a tire, an improved detection system comprising:
   a. a source of penetrating radiation;
   b. first and second spaced detectors each positioned to receive said radiation and for emitting a first detection signal upon the receipt of a first quantum level of energy and a second detection signal upon the receipt of a second quantum level of energy having a value different than said first quantum level of energy;
   c. first circuit means coupled to said first detector for developing a first reference signal having a value representative of the time duration of said second detection signal developed by said first detector;
   d. second circuit means coupled to said second detector for developing a second reference signal having a value representative of the time duration of said second detection signal developed by said second detector;
   e. comparator circuit means coupled to said first and second circuit means for developing an output signal having a value representative of the value of the first or second reference signal having the least value; and,
   f. reject circuit means coupled to said comparator circuit means for developing a reject signal upon the receipt of an output signal having a value different than a predetermined value indicating a splice of unacceptable width.

24. An apparatus as defined in claim 23 wherein said reject circuit means includes an integrator circuit means for developing a control signal having an amplitude representative of the value of a said output signal.

25. In a tire inspection system for inspecting splices in a tire, an improved detection system comprising:
   a. a source of penetrating radiation;
   b. first and second spaced detectors each positioned to receive said radiation and for emitting a first detection signal upon the receipt of a first quantum level of energy and a second detection signal upon the receipt of a second quantum level of energy having a value different than said first quantum level of energy;
   c. first circuit means coupled to said first detector for developing an output signal upon the receipt of a said second detection signal;
   d. timing circuit means coupled to said first circuit means for developing a first reference signal at a predetermined period of time after the receipt of a said output signal from said first circuit means;
   e. second circuit means coupled to said second detector for developing a second reference signal upon receipt of a said second detection signal;
   f. logic circuit means coupled to said timing circuit means and said first circuit means for developing an output signal upon the receipt of a first and a second reference signal;
   g. counting circuit means coupled to said logic means for providing a control signal having a value representative of the value of the number of output signals developed by said logic circuit means; and, h. reject circuit means coupled to said counting circuit means for developing a reject signal upon receipt of a control signal having a value different than a predetermined value indicating that the number of splices detected in a ply is unacceptable.

26. An apparatus as defined in claim 25 wherein said logic circuit means includes a gate circuit for developing a said output signal upon substantially simultaneous receipt of a said first and second reference signal.

27. In a tire inspection system for inspecting splices in a tire, an improved detection system comprising:
   a. a source of penetrating radiation;
   b. first and second spaced detectors each positioned to receive said radiation and for emitting a first detection signal upon the receipt of a first quantum level of energy and a second detection signal upon the receipt of a second quantum level of energy having a value different than said first quantum level of energy;
   c. first circuit means coupled to said first detector for developing an output signal upon the receipt of a said second detection signal;
   d. first timing circuit means coupled to said first circuit means for developing a first reference signal at a predetermined period of time after the receipt of a said output signal from said first circuit means;
   e. second circuit means coupled to said second detector for developing a second reference signal upon receipt of a said second detection signal;
   f. logic circuit means for, upon receipt of a said first and second reference signal, developing a control signal;
   g. second timing circuit means coupled to said logic circuit means for developing a third reference signal for a predetermined period of time after the receipt of a said control signal from said logic circuit means; and,
   h. reject circuit means coupled to said second timing circuit means and to said second circuit means for developing a reject signal upon substantially simultaneous receipt of a second reference signal and a third reference signal indicating that the spacing between splices is unacceptable.

28. An apparatus as defined in claim 27 including an integrator circuit means for developing an output signal having an amplitude representative of a duration of said control signal.

29. An apparatus as defined in claim 28 wherein said logic circuit means includes a gate means for developing a said control signal upon substantially simultaneous receipt of a said first and second reference signal.

30. In a tire inspection system for inspecting splices in a tire, an improved detection system comprising:
   a. a source of penetrating radiation;
   b. first and second spaced detectors each positioned to receive said radiation and for emitting a first detection signal upon the receipt of a first quantum level of energy and a second detection signal upon the receipt of a second quantum level of energy having a value different than said first quantum level of energy;
   c. first circuit means coupled to said first detector for developing a first reference signal having a value representative of the time duration of said second detection signal developed by said first detector;
   d. second circuit means coupled to said second detector for developing a second reference signal having a value representative of the time duration of said second detection signal developed by said second detector;
   e. comparator circuit means coupled to said first and second circuit means for developing an output signal having a value representative of the value of the first or second reference signal having the greater value; and,
   f. reject circuit means coupled to said comparator circuit means for developing a reject signal upon the receipt of an output signal having a value different than a predetermined value indicating a splice of unacceptable width.

31. An apparatus as defined in claim 30 wherein said reject circuit means includes an integrator circuit means for developing a control signal having an amplitude representative of the value of a said output signal.

32. An apparatus as defined in claim 31 wherein said reject circuit means includes a gate circuit for developing a reject signal upon receipt of said control signal having an amplitude more than a preselected value.

33. In an X-ray tire inspector for inspecting splices in a tire, an improved detection system comprising:
   a. a source of penetrating radiation;
   b. first and second spaced detectors each positioned to receive such radiation and to emit signal proportional to the quantum of energy received; and,
   c. circuit means connected to said detectors responsive to said detector signals for emitting a tire reject signal whenever a signal from the first detector of an energy level indicative of the presence of overlapped cords of a tire splice in the beam path between the beam source and the first detector differs from a corresponding signal from the second detector indicative of the presence of the same splice in the beam path between the source and the second detector by more than a predetermined amount, the difference between the first detector signal and the corresponding second detector signal indicating a splice having an unacceptable taper.

34. In an X-ray tire inspector for inspecting splices in a tire, an improved detection system comprising:
   a. a source of penetrating radiation;
   b. first and second spaced detectors each positioned to receive such radiation and to emit signals proportional to the quantum of energy received; and,
   c. circuit means connected to said detectors responsive to said detector signals for emitting a tire reject signal whenever a first signal from the first of the detectors indicating the presence of a splice in the beam path between the source and the first detector is followed less than a predetermined time interval by a second signal from the other one of the detectors indicating the presence of another splice in the beam path between the source and the other detector thereby indicating the two splices are spaced less than a minimum acceptable distance.

35. In an X-ray tire inspector for inspecting splices in a tire, an improved detection system comprising:
   a. a source of penetrating radiation;

b. first and second spaced detectors each positioned to receive such radiation and to emit signals proportional to the quantum of energy received; and, c. circuit means connected to said detectors and responsive to said detector signals for emitting a tire reject signal whenever the time duration of a detector signal indicative of the presence of a cord splice in a path between the source and one of the detectors exceeds a predetermined value indicating the presence of a splice having an overlap exceeding the minimum acceptable value.

36. In an X-ray tire inspector for inspecting splices in a tire, an improved detection system comprising:
   a. a source of penetrating radiation;
   b. first and second spaced detectors each positioned to receive such radiation and to emit signals proportional to the quantum of energy received; and,
   c. circuit means connected to said detectors and responsive to said detector signals for emitting a tire reject signal whenever the signal emitted by either detector is less than a predetermined value indicating a defective splice in which there is a gap between ends of the cords of two sections of a ply.

37. The method of inspecting a tire to determine whether a splice in a ply of the tire is within an established tolerance comprising:
   a. positioning first and second detectors in first and second paths of penetrating radiation emanating from a source;
   b. positioning a tire such that portions of the tire are between the source and the detectors;
   c. moving the tire and the detectors relatively such that a splice in a ply of the tire traverses the first and the second path; and,
   d. comparing the time duration of signals emitted by the detectors as the paths are traversed by the plies thereby to determine the amount of taper in the splice.

38. In an X-ray tire inspector for inspecting splices in a tire, an improved detection system comprising:
   a. a source of penetrating radiation;
   b. a plurality of radiation responsive detectors positioned to receive such radiation and to emit signals in response to radiation received; and,
   c. circuit means connected to said detectors and responsive to said detector signals for emitting a tire reject signal whenever signals from the detectors are of energy levels indicative of a tire splice in the beam path between the beam source and one or more of the detectors having at least one of the following splice defects causing said signals to vary from acceptable values by more than a predetermined amount:
      i. excessive splice width
      ii. excessive splice taper
      iii. a gap between ends of the elements of a tire ply indicative that the elements fail to abut or overlap from one end of the splice to another.

39. A method of inspecting splices in a tire comprising the steps of:
   a. irradiating a tire with a source of penetrating radiation;
   b. developing a first detection signal having a value representative of the level of radiation penetrating said tire along a first path of travel of radiation;
   c. developing a second detection signal having a value representative of the level of radiation penetrating said tire along a second path of travel of radiation; and,
   d. developing a reject signal whenever said first and second signals are of energy levels indicative of a tire splice in the radiation paths having at least one of the following splice defects:
      i. excessive splice width
      ii. excessive splice taper
      iii. a gap between ends of the elements of a tire ply indicative that the elements fail to abut or overlap from one end of the splice to another.

* * * * *